United States Patent [19]

Tarr et al.

[11] Patent Number: 5,393,550
[45] Date of Patent: Feb. 28, 1995

[54] FAT SUBSTITUTE

[75] Inventors: Bryan D. Tarr, Missoula; Steven H. Bixby, Lolo, both of Mont.

[73] Assignee: Nurture, Inc., Missoula, Mont.

[21] Appl. No.: 47,846

[22] Filed: Apr. 15, 1993

[51] Int. Cl.$^6$ .................... A23L 1/0522; A23L 1/10
[52] U.S. Cl. .................... 426/573; 426/656; 426/661; 426/804
[58] Field of Search ............... 426/573, 656, 661, 804

[56] References Cited

U.S. PATENT DOCUMENTS

| | | |
|---|---|---|
| 3,962,465 | 6/1976 | Richter et al. . |
| 3,986,890 | 10/1976 | Richter et al. . |
| 4,089,848 | 5/1978 | Bell et al. ........................ 260/112 |
| 4,154,728 | 5/1979 | Oughton ........................ 260/123.5 |
| 4,154,728 | 5/1979 | Oughton . |
| 4,462,939 | 7/1984 | Boocock et al. . |
| 4,571,347 | 2/1986 | Izzo et al. . |
| 4,734,287 | 3/1988 | Singer et al. . |
| 4,797,300 | 1/1989 | Jandacek et al. . |
| 4,810,516 | 3/1989 | Kong-Chan . |
| 4,861,613 | 8/1989 | White et al. . |
| 4,911,946 | 3/1990 | Singer et al. . |
| 4,927,654 | 5/1990 | Barnett et al. . |
| 4,952,413 | 8/1990 | LaBarge et al. . |
| 4,954,360 | 9/1990 | Barnett . |
| 4,963,386 | 10/1990 | Klemann et al. . |
| 4,973,489 | 11/1990 | Meyer et al. . |
| 4,985,270 | 1/1991 | Singer et al. . |
| 5,011,701 | 4/1991 | Baer et al. . |
| 5,021,248 | 6/1991 | Stark et al. . |
| 5,051,271 | 9/1991 | Iyengar et al. . |
| 5,102,681 | 4/1992 | Singer et al. . |
| 5,104,674 | 4/1992 | Chen et al. ........................ 426/573 |

FOREIGN PATENT DOCUMENTS 0146174 11/1984 European Pat. Off. .

OTHER PUBLICATIONS

Hoseney, *Principles of Cereal Science and Technology*, p. 101 (American Association of Cereal Chemists, Inc. St. Paul, Minn. (1986)).

Webster, Francis, *Oats: Chemistry and Technology*, p. 68; p. 95 (American Association of Cereal Chemists, Inc. St. Paul, Minn (1986)).

*Primary Examiner*—Donald E. Czaja
*Assistant Examiner*—Curtis E. Sherrer
*Attorney, Agent, or Firm*—Knobbe, Martens, Olson & Bear

[57] ABSTRACT

The present invention provides a novel fat substitute composition, comprised primarily of a defatted and substantially nondenatured proteinaceous particulate material, that, in a preferred embodiment is derived from seed grains, and most preferably oats. In addition, a method of making such compositions and using the same to produce food products having a reduced caloric count, creamy texture, and suitable mouth-feel, is disclosed. Further, a method to vary the viscosity of the resulting food products is disclosed, through changing the ratio of starch to protein in the fat substitute.

16 Claims, No Drawings

FAT SUBSTITUTE

BACKGROUND OF THE INVENTION

1. Field of the Invention

The present invention relates to novel fat substitute compositions comprised of naturally derived porous particles consisting of carbohydrate, polysaccharides, and protein, preferably from seeds. Such particles are formed as powdered particulates that can be used to produce a reduced calorie food product.

2. Description of the Prior Art

There is a continuing need in the food industry for fat substitutes that can be used to prepare reduced calorie food products. The fat substitute is used in lieu of some or all of the fats that would ordinarily be found in such products. The food science and technology art has taken a variety of approaches to formulating fat substitutes. These include the use of substances, such as starches, gums, or proteins to mimic the mouth-feel of fat.

Non-digestible fat-like substances are typically based on compositions that contain synthetic materials, such as sucrose polyesters, epoxide extended polyols, polyalkylene oxides, or other complex linked esters, including saccharide polyesters. An example of a sucrose polyester is Procter & Gamble's OLESTRA ® which is still under development. One problem with the approach of utilizing synthetic fat substitutes are the possible deleterious physiological effects that may be associated with the introduction of such materials into the human body. For example, because they pass undigested through the body, they could inhibit assimilation by the body of fat-soluble vitamins and other nutrients.

Examples of certain synthetic materials that are indicated as useful as fat substitutes are disclosed in U.S. Pat. No. 4,973,489 to Meyer (saccharide polyesters), U.S. Pat. No. 4,963,386 to Klemann (complex linked esters), U.S. Pat. No. 4,952,413 to LeBarge (polyalkylene oxides having texturizing properties), U.S. Pat. No. 4,861,613 to White (esterified epoxide-extended polyols as non-digestible fat mimetics), U.S. Pat. No. 4,810,516 to Kong-Chan (chocolate confections containing sucrose polyesters), and U.S. Pat. No. 4,797,300 to Jandacek (sucrose polyesters).

However, as will be appreciated by one of skill in the art, it would be useful to form a fat substitute of known biocompatability. Proteins and starches fulfill this requirement, in that they have long been consumed by humans and have known metabolic routes in the human body. The source of the protein may be either animal or vegetable. Further, in general, such materials may be used either in their natural form or may be chemically modified to form derivatives which may then be used as fat substitutes.

The art discloses several such chemically modified proteins and starches. U.S. Pat. No. 3,962,465 to Richter discloses that conventional starches were unsuitable for use as fat substitutes because in their hydrated form, they formed a pasty consistency and possessed an objectionable taste. Thus, Richter enzymatically hydrolyzed starches for use as a food additive. In U.S. Pat. No. 3,986,890 to Richter, a mixture of two starches was disclosed, wherein at least one of the starches was hydrolyzed. Further, in U.S. Pat. No. 4,911,946 to Singer, it was disclosed that crosslinked starch particles could be used as a food additive. A requirement of the invention appeared to be small particle size, as well as a spheroidal shape. Particles that did not conform to these requirements required further processing to form a suitable spherical shape and small particle size.

U.S. Pat. No. 5,051,271, to Lyengar, et al., discloses the use of chemically or enzymatically hydrolyzed starches, in order to remove the amorphous region of the starch molecule, for use as a bulking agent, among other things.

Cellulose, both modified and unmodified, has also been disclosed as a possible composition for use as a fat substitute. For example, in U.S. Pat. No. 4,927,654 to Barnett, hemicellulose or delignified plant fiber mixtures were employed for use as food additives. Such mixtures are disclosed as water soluble. U.S. Pat. No. 4,954,360 to Barnett discloses a partially delignified plant fiber for use as a food additive. Such plant fiber could be derived from a variety of sources, including oat bran. In both patents, chemical modification would result from delignification, since alkaline extraction was used in the delignification. The delignified fiber was used for ice crystal inhibition in frozen foods in relatively low concentrations, on the order of 0.05 to 1%. The use of chemically unmodified cellulose was disclosed in U.S. Pat. No. 5,011,701 to Baer, where microcrystalline cellulose was physically modified through coating the cellulose with xanthan gum and used in low concentrations of between 0.25 and 4%.

In U.S. Pat. No. 4,571,347 to Izzo, it was disclosed that superior mouth-feel could be imparted to margarine by incorporating macro-sized lumps of synthetic or natural fat.

With respect to natural materials, there have been a variety of approaches for preparing food additives or fat substitutes from such materials without substantial chemical modification or alteration. For example, in Boocock, U.S. Pat. No. 4,462,939, a defatted oat protein slurry was produced through isotopic distillation of ethanol and water. The resulting slurry was used to produce an oat protein fraction having a low bulk density. The patent discloses that such a slurry could be used as a nutritional protein source.

In U.S. Pat. No. 4,734,287 to Singer, denatured dairy whey particles having a small size were disclosed. The protein possessed a high degree of thermal fragility which is characteristic of animal proteins. In U.S. Pat. No. 4,985,270 to Singer, it was disclosed that a coagulable protein, such as egg white, may be used to surround a protein core. The preferred protein sources for use in the invention are disclosed to be water soluble proteins which, after denaturization, are subjected to shear and separated to form particles where less than 2% of the particles exceed 3 microns and are more preferably between about 0.1 and 2 microns.

U.S. Pat. No. 5,021,248 to Stark, discloses water-dispersable microparticles of hydrophobic, water-insoluble, non-denatured protein for use as a fat substitute. Such proteins can be formed into a suspension by controlled precipitation of the protein and the suspension can be used as a substitute for most dietary fats or to encapsulate selected molecules. In a preferred respect, the protein comprised zein, a prolamine from corn.

Fats have approximately 9 calories per gram, whereas proteins have approximately 4 calories per gram. Thus, by replacing fats in foods with proteins, a significant caloric saving is obtained. Diets high in fats are believed to lead to a variety of health disorders, including coronary artery disease and obesity. An added benefit obtained from replacing fats with proteins or other substances is an increased nutritional benefit, as well as reduction in the caloric content. However, for a fat substitute to be acceptable, it must be devoid of odors, flavors and colors which would render it unacceptable as a food additive or ingredient. In addition, there must be a tendency of the fat substitute to mimic the organoleptic qualities of a fat.

Organoleptic qualities are such traits as bland taste, creamy texture and mouth-feel, which are associated with the eating of a fat. The most important organoleptic attribute is mouth-feel. Mouth-feel consists of the collection of sensory impressions (e.g., smoothness, creaminess, grittiness, lubricity) which a substance creates in the mouth of an individual tasting the substance. Natural fats form a layer or coating on the tongue. This coating property, as well as the creamy, smooth texture of natural fats, must be reproduced by the fat substitute. Many fat substitutes provide the desired organoleptic properties only in particular food formulations.

Thus, a need remains in the food chemical and technology art for a fat substitute with a lower caloric count, high nutritional qualities, and fat-like organoleptic qualities, without undesirable odors, flavors and colors and which is versatile in regards to cooking conditions.

SUMMARY OF THE INVENTION

In accordance with the present invention, there is provided a fat substitute that comprises a microparticulate partially or substantially defatted chemically unmodified oat starch carbohydrate or polysaccharide, either alone or in combination with a partially or substantially defatted chemically unmodified oat protein, which may be suitably used in food preparations to reduce caloric content, as well as enhance nutritional qualities. Further, the fat substitutes of the present invention possess a bland taste which permits the addition of customary concentrations of synthetic or natural flavors without the need to mask the flavor of the fat substitute, if desired.

The fat substitutes of the present invention also yield a creamy texture when prepared in food compositions. Furthermore, the fat substitutes of the present invention are highly digestible. Because they are not chemically modified, they are well tolerated by the body. Such toleration by the body is in contrast to certain other fat substitutes, for example, sucrose polyesters, that can leach vitamins from the gut or cause gastrointestinal disturbances. See e.g., Singer, U.S. Pat. No. 4,911,946. Additionally, the fat substitutes of the present invention are fully biocompatible, since they are natural products.

Furthermore, the fat substitutes of the present invention are markedly versatile in that they may be used in either frozen or hot food preparations, in contrast to certain other fat substitutes.

The fat substitutes of the present invention also possess the desirable organoleptic qualities that are associated with fats. Thus, the fat substitutes of the present invention represent a marked improvement over the art.

In accordance with one aspect of the present invention, there is provided a composition for use in lieu of some or all of the fats that would typically be combined to form a food product. The composition comprises an end product of organic solvent extraction of seed to remove most of the lipids in order to obtain a mixture of starch and protein from the seed. In a preferred embodiment, seeds are selected from the group consisting of legumes and grains. In another preferred embodiment, the seeds are selected from the group consisting of canola, beans, oats, rape seeds, barley, and soya. In a preferred embodiment, the seed is barley. In a highly preferred embodiment, the seed comprises oats. The ratio of starch to protein varies; however, in a preferred embodiment, the ratio is about 60–95% starch to about 15–40% protein, preferably about 85% starch to about 15% protein, dry weight. As will be understood, when the compositions are prepared by solvent extraction of a seed starting material, the proteinaceous particulate materials also include additional components, such as fats, other carbohydrates, $\beta$-glucans, and dietary fibers.

In accordance with another aspect of the present invention, there is provided a method to prepare partially defatted seed starch and protein compositions for use as fat substitutes that comprises the steps of extracting grains with an organic solvent to remove organic soluble materials, removing solid materials that are not soluble in the organic solvent, and evaporating the organic solvent from the solid materials to obtain a mixture of starch and protein from said seed. In a preferred embodiment, the lipids are extracted from the grains such that at least between 40% and 80% of the lipids are removed. Preferably, at least between 75% and 80% of the lipids are removed.

In accordance with yet another aspect of the present invention, there is provided a method to prepare reduced calorie foods comprising substituting, either partially or totally, the fats called for in a recipe with a fat substitute, wherein said fat substitute comprises a mixture of mostly defatted starch and protein derived from seeds. In a preferred embodiment, the seeds are oats. The method may advantageously also include a step of adding gelatin in an amount effective to control a temperature at which the gel will melt.

DETAILED DESCRIPTION OF THE PREFERRED EMBODIMENTS

The present invention includes the discovery that the structural architecture remaining after lipids are removed from a protein containing starting material may be used as a replacement for fats in food preparations. In a preferred embodiment, the protein containing starting material is derived from a vegetable source or any fraction thereof. In such embodiment, the architecture that remains may be thought of as containing a variety of building blocks. The building blocks include a variety of substituents, such as protein, starch, small quantities of less soluble fats, ash, carbohydrates, $\beta$-glucans, and dietary fiber.

It will be appreciated that fats (i.e., the lipids that are removed through organic solvent extraction) have a caloric value of about 9 calories per gram, while the majority of the components in the architecture have caloric values of about 4 calories per gram. Thus, the caloric savings are apparent.

In general, the partially or substantially defatted proteinaceous materials that are suitable for use in preparing the fat substitutes of the present invention are derived from a vegetable source. Preferably, they are derived from seed grains, for example, canola, beans, oats, rape seeds, soya, and barley. In a preferred embodiment, the seed grain is barley. In a highly preferred embodiment, the seed grain is oats.

As will be discussed in greater detail below, the general process for manufacturing the compositions comprising the fat substitutes of the present invention includes the extraction of lipids from carbohydrate, starch, polysaccharide, and protein containing seeds, portions of seeds, or other moieties, with an appropriate organic solvent, preferably in the absence of water. The compositions are thereafter desolventized, such that the solvent that was used for removing the fat is removed from contact with the compositions.

In a preferred embodiment, discrete portions of a seed are used as the starting material. For example, the bran or endosperm of the seed may be used. In another preferred embodiment, further milling steps are followed to obtain the fat substitutes of the present invention. Optionally, protein content can be varied by certain concentration techniques. However, in a preferred embodiment, the fat substitute compositions contain a relative ratio of starch to protein of approximately 60–90% starch and 10–40% protein. In a highly preferred embodiment, the compositions contain about 85% starch and 15% protein. In this sense, the invention is a starch-dominated invention.

In addition to caloric savings, the fat substitutes of the present invention provide other benefits. These include a bland taste, which permits the addition of only customary concentrations of synthetic or natural flavors without the need to mask the flavor of a fat substitute. Additionally, the fat substitutes of the present invention are fully digestible and well tolerated by the human body. Furthermore, the fat substitutes of the present invention are a completely natural and non-toxic product; in a preferred embodiment, only lipids have been removed. Also, through use of the fat substitutes of the present invention, food products prepared thereby possess an extremely creamy texture/mouth-feel.

However, in contrast to the prior art, the particle sizes of the fat substitute compositions of the present invention need not be extremely small. In fact, extremely creamy textures may be achieved using particles up to 12 microns and larger. Compare, for example, U.S. Pat. No. 4,985,270 to Singer, wherein it is disclosed that the preferred particle size distribution for its proteinaceous fat substitute should have a median particle size diameter between 0.1 and 2 microns, with less than 2% of the particles exceeding 3 microns.

Even larger particle sizes may be used with good effect. We have found that particle sizes, prior to formulation, may range up to 200 $\mu$m, and in some cases up to 300 $\mu$m. Highly preferred formulations can be prepared with particles that range from 12 to 300 $\mu$m, prior to formulation.

Further, the fat substitutes of the present invention are exceptionally versatile, in that they may be used in either frozen or hot food preparations. It will be appreciated by one of skill in the art that certain protein-based fat substitutes cannot be cooked because of particle agglomeration. Furthermore, certain natural starches which have been used as food additives cannot be frozen because of irreversible and undesirable transformations upon defrosting. See, for example, Richter, U.S. Pat. No. 3,962,465 (disclosing hydrolyzed starch compositions for use to overcome the freezing limitations of natural starch).

Moreover, since food products formed using the fat substitutes of the present invention may be cooked or frozen, a variety of food products can be formulated, including fat-free ice cream substitutes (technically referred to as icemilks or non-dairy frozen desserts, since "ice cream" connotes a given butterfat concentration), fat-free cake icings, fat-free salad dressings, fat-free butter substitutes, fat-free candies, non-dairy fat-free ice creams, non-dairy fat-free puddings, non-dairy fat-free yogurt, non-dairy fat-free cheese or cheese spreads, and non-dairy fat-free sour cream, to name but a few. Further, these products, where appropriate, may be served hot or cold. Also, in each instance, the food products truly mimic the organoleptic character of the same food with fat.

As will be discussed in greater detail below, the method of preparing such fat-reduced or fat-free formulations of the present invention generally involves heating a small amount of the fat substitute of the present invention in water or another aqueous liquid, such as milk (non-fat or otherwise) below the boiling point of the liquid until the mixture is transformed into a thick gel-like material. Thereafter, depending on the recipe, the resulting material may be combined with other ingredients, such as skim milk or other non-fat milk solids; ingredients to add texture, such as carrageenan; flavorings; sweeteners; and other ingredients.

Further, by varying the protein content of the fat substitute of the present invention, one is able to control the viscosity of the resulting gel. For example, by increasing the protein content of the fat substitute, viscosity is decreased. This is useful for controlling the viscosity of puddings, sauces, dressings and the like.

I. Separation of the Vegetable Starches and Proteins for Use as the Fat Substitutes of the Present Invention A number of known processes exist for the preparation of suitable proteinaceous and starch material for use in the present invention.

Oughton, in U.S. Pat. No. 4,154,728, describes a process for separating fractions of differing compositions from comminuted proteinaceous material from a variety of food sources, including wheat, rye, barley, triticale, peas, and buckwheat. The Oughton process comprises mixing the proteinaceous material with an aliphatic hydrocarbon or alcohol suitable to dissolve the lipids in the material. The wet slurry is distributed by means of centrifugation into fractions which differ primarily in protein composition, as well as starch composition. A similar process is applied to comminuted oats in U.S. Pat. Nos. 4,211,695 and 4,211,801, also to Oughton.

To facilitate recovery of the protein, in particular, from the slurry produced in accordance with the foregoing processes, U.S. Pat. Nos. 4,208,295 and 4,208,260 to Oughton disclose the application of an electric field to the mixture and collection of a comminuted oat fraction which clings to the anode. An improved method of recovery is disclosed in U.S. Pat. No. 4,407,841 to Boocock, comprising the addition of aqueous ethanol to the slurry to agglomerate the proteinaceous material and to facilitate the separation thereof.

Accordingly, the method of separation of starches and proteins from protein containing materials, comprises extracting the protein and starch from the seed with organic solvents, such as propanol, ethanol, or hexanes. This process removes the lipids and allows separation of other insoluble materials. It is preferred to use solvents that are nontoxic, since the materials are intended to be consumed by humans.

After the extraction of lipids and separation of the proteins and starch, the particles are separated to a desired particle size or range of sizes, depending upon the desired end use of the material. Suitable particle sizes of the starch and protein compositions that form the fat substitutes of the present invention may be as large as or larger than 12 microns. Indeed, as mentioned above, an unexpected advantage of the fat substitute compositions of the present invention is that significantly larger particle sizes than previously believed possible may be used without loss of the desired creamy texture of the food product. Further, even when such larger particles are used, the foods prepared therewith appear to unexpectedly retain the same organoleptic qualities as when smaller particles are utilized.

The fat substitutes of the present invention may be used with relatively larger particle sizes than other fat substitutes in the prior art. For example, we have discovered that particle sizes, prior to formulation, may range up to 200 μm, and in some cases up to 300 μm. Highly preferred formulations can be prepared with particles that range from 12 to 300 μm, prior to formulation. Where desired, nevertheless, smaller particle sizes may be prepared through conventional grinding, milling, and sieving steps that are well known to those of skill in the art. Thus, particle sizes ranging down to about 0.5 microns and up to about 300 microns are possible depending upon separation and the chosen application. Accordingly, preferred average particle sizes can range from about 0.5 μm to about 300 μm, more preferably from about 1 μm to about 20 μm, or even more preferably from about 2 μm to about 12 μm. Subsequent milling and/or separation steps are often unnecessary after extraction of the lipids and other undesired materials from the starting materials.

The materials are typically desolventized to remove solvents used for removal of the lipids. Desolventization can be accomplished by any number of known techniques, such as decanting, filtration, oven drying at slightly elevated temperatures, or subjecting the powder to a vacuum with or without the addition of minimal heat, or any combination of these techniques. Thereafter, in a preferred embodiment, the resulting particulates are advantageously carefully heated and/or dried prior to use to remove any residual solvents.

Lipid contents of cereal grains varies widely as well; however, generally, it is found that most cereal grains have a lipid content of about 3%. This is true for rye, rice, and barley. Oats' lipid content generally runs higher than those of other cereals, but varies quite widely. Values as low as 3% and as high as 12% have been reported. However, most lines contain about 5 to 9% lipids. E.g., Hoseney, *Principles of Cereal Sciences and Technology*, p. 101 (American Association of Cereal Chemists, Inc. St. Paul, Minn.

The removal of lipids in the present invention serves several purposes. First, lipid removal reduces the caloric value of the seed material. Second, most of the flavor associated with seeds arises from the lipid content. Thus, removal of lipids allows the fat substitute to have a bland taste due to the removal of the lipids, plus, the fat substitutes of the present invention are further reduced in their caloric content by virtue of the removal of lipids. The remaining architecture consisting of starches, proteins, as well as other lower calorie components is lower in overall caloric count. Third, the lipid-free nature of the material is believed to be important in its function as a fat substitute.

EXAMPLE I

Preparation of the Fat Substitutes of the Present Invention from Oats

Dried oats were ground using conventional techniques. As will be understood, in the grinding process, a broad spectrum of particle sizes are formed, from "fines" to "roughs," which are separated, one from the others, through conventional sieving apparatus. The fines generally have an average particle size range from about 1 to about 100 μm, and the roughs generally have a particle size range from about 100 to about 600 μm.

Typically, fines are suitable for refined emulsion and fat substitute preparations, and roughs may be appropriately used in other applications. Accordingly, the fines were collected and placed in a vat containing hexane and stirred for between 1 to 3 hours. The hexane solubilized the lipids in the particles.

Thereafter, the solution was centrifuged at 4500×gravity to layer out the insoluble proteinaceous materials. Next, the hexane was carefully decanted and the solid materials were air dried at room temperature and at reduced humidity (i.e., relative humidity not exceeding 50 percent). Care was taken to ensure that the entire process remained relatively anhydrous.

The materials may alternatively be separated by selecting the bran fraction or the endosperm fraction of the oats to obtain compositions possessing different properties. For example, compositions with a lower starch to protein content can be obtained from the bran. Alternatively, compositions with higher starch to protein contents can be obtained from the endosperm.

EXAMPLE II

Alternative Preparation of the Fat Substitutes of the Present Invention from Oats In an alternative preparation, the fat substitute compositions can be derived as follows:

A. Predominantly Starch

A predominantly starch based fat substitute can be obtained through the following process. Oats are cleaned and degritted and allowed to dry. Thereafter, the oats are ground using a pin mill, available from Micron Powder Systems, Summit, N.J. The ground materials are run through a 710 micron sieve to remove any large materials still remaining after grinding (such as flakes, shell, and other large material). 500 grams of the ground oats are mixed with 2000 mls aqueous ethanol (50% v/v) and stirred at 25 degrees centigrade (°C.) for approximately 60 minutes.

The resulting slurry is centrifuged under 4500×gravity for 30 minutes. The starch and protein layer out according to specific gravity, with the prime starch as the heaviest layer. This predominantly starch layer, through repeated washings and layering, may be reduced to approximately 0.44 through 0.6% protein. The lipid content of this layer is about 1.0%. Lipid content may be reduced further through reextraction in an organic solvent, such as ethanol in this example. However, we find that this level of lipid is acceptable.

The average particle size diameters of the composition are between 40 and 200 microns, as determined by a MICROTRAC ® brand particle size analyzer. Optionally, smaller particles may be obtained, as discussed above.

The final product is dried in a porcelain oven for one hour at 80° C. and is ready for use.

B. Starch with Elevated Protein Content

Either of two approaches can be used to obtain oat starch with enhanced protein content to prepare the fat substitutes of the present invention.

1. Adding Protein to Separated Starch

In one method, the oat protein that is obtained as a byproduct in our preparation of oat starch, in Example IIA, can be suitably added in weight per weight units to the oat starch to achieve the desired ratio of starch to protein. Thus, in order to obtain a desired ratio of starch to protein, one starts with a known quantity of starch and mixes in the desired quantity of protein. Thus, for example, to obtain a preferred ratio for certain aspects of the present invention of 85% starch to 15% protein, one can mix 8.5 grams of starch with 1.5 grams of protein.

2. Incomplete Gravimetric Separation

In the alternative, lower centrifugation speed can be used to achieve incomplete gravimetric separation. By varying the ratio of the starch to protein in the fat substitute, one can control the viscosity of the finished food product. Variations in the speed of centrifugation permit selection of the amount of protein isolated with the starch.

The procedure provided in Example IIB works suitably for the separation of starches and proteins from other grains and legumes.

It will also be appreciated that the starch/protein compositions of the present invention, because of their minimal processing, remain substantially non-denatured and thus their native structure is substantially intact. In contrast to the prior art, there is no use of acid or alkaline extraction that would tend to denature the proteins. Further, in a preferred embodiment, drying of the fat substitute compositions of the present invention is accomplished under limited heat. This also substantially avoids denaturing the proteins. Denaturization of cereal grain protein structures are discussed in greater detail in Hoseney, *Principles of Cereal Science and Technology*, supra, p. 72.

II. The Fat Substitute Compositions of the Present Invention

In accordance with another aspect of the present invention, there is provided a fat substitute composition that comprises a mixture a proteinaceous particulate material derived from seeds, wherein the particles are defatted and remain substantially non-denatured or substantially chemically intact. The starch and protein particles may be derived through the methods that were discussed above. Generally, this method comprises extracting the lipids from the seed with organic solvents, such as propanol, ethanol, or hexanes. Most preferably extraction is accomplished in hexanes. The resulting particulate materials are a complex structural unit of proteins and starches, as well as other components.

The particulates may be derived from any seeds. However, in accordance with the preferred embodiment of the present invention, oats are preferred. Oats appear to derive a large part of their flavor from their lipid content. Thus, the resulting starch and protein after removal of the lipids appear to contain less flavor, which provides the fat substitutes of the present invention with a relatively bland taste. Barley is also particularly preferred.

Another unexpected advantage of the starch and protein particulates for use as a fat substitute of the present invention is the fact that even with their larger average particle size, i.e., on the order of 3 to 12 microns, or even larger, an unusually creamy texture is generated in food products prepared with such fat substitutes. This is in contrast to disclosures of the prior art, which suggest that a fat substitute must have a particle size distribution range between 0.1 and 2 microns, with less than 2% of the particles exceeding 3 microns. E.g., Singer, U.S. Pat. No. 4,985,270.

In addition to creamy texture, the fat substitutes of the present invention have remarkable versatility. For example, the fat substitutes may be used in either frozen or hot food preparations. This is in bold contrast to certain other fat substitutes, such as the Singer material, which cannot be cooked because of particle agglomeration, and certain other natural starches, which cannot be frozen because of irreversible and undesirable physical transformations upon defrosting. E.g., Richter, U.S. Pat. No. 3,962,465.

Moreover, an additional advantage of the fat substitutes of the present invention is that they are fully digestible and totally non-toxic. This is so because the fat substitutes of the present invention are derived from seeds and are not chemically modified; thus, they are well tolerated by the body.

In another novel aspect of the present invention, there is provided a method to control the viscosity of the food preparations of the present invention. The method comprises varying the protein content in the starch to protein ratio. Through increasing the ratio of protein to starch, a reduced gel viscosity is observed. As will be appreciated, viscosity variation provides versatility in preparing different types of food products. For example, for making ice cream, puddings, icings, among others, one typically desires a more viscous gel. Whereas, when making yogurt, milk shakes, and other beverages, one desires a somewhat more liquid consistency.

EXAMPLE III

Increasing or Decreasing Viscosity Through the Use of Proteinaceous Particulate Materials Enriched in Either Starch or Protein To increase or decrease the viscosity of a gel prepared in accordance with the present invention, the ratio of starch to protein contents can be altered. For example, a fat substitute prepared in accordance with the present invention that possesses a starch to protein ratio of 88% to 12% has a viscosity of 61,300 cps. However, a similar mixture wherein the ratio of starch to protein is 80% to 20% has a viscosity of 61,300 cps. Finally, a mixture containing a starch to protein ratio of 60% to 40% has a viscosity of 23,400 cps. The particular ratio for any given food to obtain the desired viscosity can be readily determined by empirical techniques. For example, for the above viscosity studies, the viscosity was measured on a Brookfield viscometer, Model DVII, with a Number 5 spindle at a rotation rate of 4 revolutions per minute.

In another aspect of the present invention, we have discovered that it is possible to control the "melting" temperature of a gel formed from the fat substitutes of the present invention. In a preferred embodiment, this is accomplished through the addition of a small quantity of gelatin during the preparation of a food product prepared with the fat substitute of the present invention. This discovery is useful in applications where the melt temperature of the gel is critical to simulating the properties of a fat-containing food. For example, for butters and margarines, melt temperature is important and the melt temperature can be controlled in the manufacture of a reduced calorie artificial butter or margarine-like spread in accordance with the present invention.

EXAMPLE IV

Varying the Melt Temperature of Food Products Prepared With the Fat Substitutes of the Invention To increase the melt temperature of a gelled food product prepared in accordance with the present invention, gelatin can be added. For example, in making a fat substitute artificial butter, the addition of approximately 2% gelatin will result in a gel that melts at approximately 40° C. Whereas, through the addition of 4% gelatin, the melt temperature can be increased to about 60° C.

III. Preparation of Food Products With Reduced Fat Content Through Use of the Fat Substitutes of the Present Invention In accordance with another aspect of the present invention, there is provided a method to prepare reduced-calorie foods comprising substituting, either partially or totally, the fats called for in a recipe with a fat substitute, wherein said fat substitute comprises a defatted proteinaceous particulate material derived from seeds that is substantially nondenatured or chemically intact.

Many recipes call for the use of butter, cream, whole milk, shortening, or other fat-based products that are high in caloric count. Often, such fats are used to aid in gelling and in bringing organoleptic qualities to foods, such as ice creams, yogurt, salad dressings, and the like. Thus, through use of the fat substitutes of the present invention, one may either partially or totally substitute the fat substitutes of the present invention for fats that are called for in a recipe.

In a preferred aspect of the present invention, a small amount of the fat substitutes of the present invention are heated in water, or another liquid, to near or just below the boiling point of the liquid. Generally, the mixture will be transformed into a thick, gel-like material, whereupon other non-fat ingredients may be advantageously added to improve nutritional values, such as skim milk or non-fat milk solids, and texturizing ingredients, such as carrageenan, may be supplemented. Further, flavorants and sweeteners may also be optionally added as required.

In general, many different formulations may be created, including fat-free ice cream substitutes, fat-free cake icings, fat-free salad dressings, fat-free butter substitutes, fat-free candies, non-dairy fat-free puddings, non-dairy fat-free yogurt, non-dairy fat-free cheese or cheese spreads, non-dairy fat-free sour cream.

In a preferred embodiment, the viscosity of the food product may be varied by choosing an appropriate ratio of starch to protein in the fat substitute composition. The fat substitute-water gel is usually formed prior to combining that material with other ingredients. This is preferred, since it provides more even mixing and better control of the viscosity. However, it is possible to add more starch (to increase the viscosity) or more protein (to lower the viscosity) after most of the ingredients are mixed. When performing the operation in this manner, it is important that the person making the food product mix it thoroughly to avoid nonhomogeneity of the gel, for example.

The following examples indicate some of the recipes wherein a reduced calorie product may be made through use of the present invention. Unless otherwise indicated, the fat substitutes indicated in the examples are comprised of defatted oat starch and protein, wherein the ratio of starch to protein is about 85% to 15%.

EXAMPLE V

Non-Fat Ice Cream Formulation

A non-fat ice cream formulation was made in the following manner:
- 1.6 grams fat substitute;
- 1.6 grams non-fat powdered milk;
- 0.1 grams pectin;
- 0.2 grams gum (such as guar gum or India gum);
- 20 ml. of skimmed milk. The skimmed milk was heated until slightly boiling; thereafter, the fat substitute was added and stirred until slightly thick, at which time the non-fat powdered milk and pectin were added. Thereafter, the formulation was cooled and the gum was added with stirring. If desired, flavorings can be added, such as cocoa, strawberry flavoring, or vanilla flavoring, along with a sweetener, such as fructose. After this step, the mixture was frozen while stirring, similar to ice cream.

Even without stirring, the mixture can be frozen after all of the ingredients are added, and no ice crystals form on the surface. One may also optionally add carrageenan to create an even softer ice cream.

EXAMPLE VI

Ice Cream Substitute

An ice cream substitute formulation was made in the following manner:
- 2.0 grams fat substitute;
- 3.0 grams powdered skim milk;
- 0.08 grams guar gum;
- 0.06 grams carrageenan;
- 2.0 grams glycerol;
- 20 ml. of distilled water.

All of the ingredients were mixed and heated to just boiling with stirring. Thereafter, the formulation was cooled to room temperature in a water bath. The resulting jelly-like mixture was then used as the "cream" to make ice cream.

Toward this end, flavorings may be added, if desired; such as cocoa, strawberry flavoring, or vanilla flavoring, along with a sweetener, such as fructose, to a desirable flavor. After this step, the mixture was frozen while stirring, similar to ice cream.

Even without stirring, the mixture can be frozen after all of the ingredients are added, and no ice crystals form on the surface.

EXAMPLE VII

Ice Cream Recipe

Another ice cream recipe is prepared as follows:
- 3.0 grams powdered skim milk;
- 2.8 grams fat substitute;
- 20 ml. light corn syrup;
- 30 ml. distilled water;
- 0.6 grams cocoa or 10 mg. vanillin;
- 0.05 grams carrageenan.

All of the ingredients were blended together and then heated to 90° C. and stirred constantly for three (3) minutes while maintaining the temperature. The mixture was allowed to cool to room temperature. Once cooled, the mixture was blended at high speed for about 30 seconds, until smooth. This mixture was then ready to be made into ice cream. Interestingly, the carrageenan and the corn syrup in combination appear to prevent ice crystal formation. Further, mixtures made without the addition of the fat substitute were less firm and lacked a certain creaminess. In other words, the taste was like ice milk. In contrast, when the fat substitute was utilized, the mixture attained a delightful creaminess.

EXAMPLE VIII

Soft Butter-Like Spread Formulation

A soft butter-type spread was made as follows:
1.0 gram fat substitute;
0.8 grams non-fat powdered milk;
10 ml. skim milk;
2.0 grams of butter flavoring.

The skim milk was heated until just below boiling, and the fat substitute was added. The mixture was then stirred until thickened. Thereafter, the non-fat powdered milk was added, followed by the addition of the butter flavoring (for instance, MOLLY MCBUTTER TM brand butter flavoring). This formula had a soft margarine-like consistency. It was spreadable and melted on contact with heated surfaces, such as toast.

Optionally, it may be placed in tubs or in a suitable dispenser, for example, a pump type container or a squeezeable container.

EXAMPLE IX

Artificial Butter

An artificial butter formulation was prepared in the following manner:
2.5 grams of fat substitute;
4.0 grams powdered skim milk;
0.25 grams carrageenan;
1.0 grams glycerol;
1.0 grams salt;
0.06 grams sodium benzoate;
2.0 grams natural butter flavor (designation WONF, International Flavors and Fragrances, Inc.)
50 ml distilled water.

All of the ingredients were combined and mixed thoroughly. Thereafter, they were heated to boiling while stirring. Then, the mixture was cooled to room temperature in a water bath. Once cool, a gel was formed.

The gel can be used as a butter substitute and dispensed from a tube-like container. Another method of dispensing the artificial butter is to blend the gel into a semi-solid mass, that is similar to a thick mustard in consistency, and dispense it from a squeezeable bottle.

EXAMPLE X

Fat Free Salad Dressing

A fat free salad dressing formulation was prepared in the following manner:
1.4 grams fat substitute;
2.0 grams powdered skim milk;
0.06 grams carrageenan;
20 ml. distilled water.

All of the ingredients were mixed together and then heated to just below boiling until the mixture thickened. Then, the mixture was cooled to room temperature in a water bath. Flavorants and spices may be added as desired to this creamy mixture to produce the salad dressing.

EXAMPLE XI

Sour Cream Substitute

A sour cream substitute is prepared in the following manner:
2.2 grams powdered skim milk;
1.4 grams fat substitute;
0.08 grams carrageenan;
30 ml. distilled water;
2.0 grams flavorant (approximately).

All of the ingredients are mixed together and heated to just below boiling until the mixture begins to thicken. Flavorants or thickeners may also be optionally added as required.

EXAMPLE XII

Non-Fat Chocolate Filling

A non-fat chocolate filling may be prepared in the following manner:
3.0 grams fat substitute;
3.0 grams powdered skim milk;
0.1 grams carrageenan;
1.0 ml glycerol;
20.0 ml distilled water;
0.3 grams cocoa;
2.0 grams powdered sugar.

All of the ingredients are combined and mixed and then heated to boiling and until slightly thick. Thereafter, the mixture is cooled to room temperature.

The amounts of sugar and cocoa can be varied to suit one's taste. Furthermore, the "chocolate" can be sugar coated.

The foregoing description details specific methods and specific compounds that can be employed to practice the present invention, and represents the best mode contemplated. However, it will be apparent to those of ordinary skill in the art that the disclosed embodiments can be modified without departing from the essence of the invention. For example, although the method of the present invention is specifically illustrated with respect to particular uses of the fat substitute compositions and other adjuvants, it is equally suitable for utilization with any number of compounds that are adapted to meet specific requirements. Thus, however detailed the foregoing may appear in text, it should not be construed as limiting the overall scope hereof; rather, the ambit of the present invention is to be governed only by the lawful construction of the appended claims.

What we claim is:

1. A food composition, comprising:
   a microparticulate starch/protein material prepared from cereal grain seeds by a process consisting essentially of milling, physical separation, and solvent extraction of lipids therefrom, wherein said starch/protein material contains at least 60% starch by dry weight and has been gelled by heating with an aqueous material to form a product having organoleptic properties of fat; and
   a separate food ingredient of animal or vegetable origin mixed in combination with said gelled starch/protein material.

2. The composition of claim 1, wherein the seeds are oats.

3. The composition of claim 1, wherein the seeds are barley.

4. The composition of claim 1, wherein the size of said microparticles prior to gelling is between about 0.5 and about 20 μm.

5. The composition of claim 5, wherein said ratio is about 85:15.

6. The composition of claim 1, wherein the ratio of starch to protein in said microparticles is between about 60:40 and about 95:5.

7. The composition of claim 1, wherein said food composition is a dairy product or dairy product substitute.

8. A method for preparing low fat or fat free food, comprising:

providing a fat substitute comprising microparticulate starch/protein material prepared from cereal grain seeds by a process consisting essentially of milling, physical separation, and solvent extraction of lipids therefrom, wherein said starch/protein material contains at least 60% starch by dry weight; and combining said fat substitute with other food ingredient of animal or vegetable origin to form a finished food product in which said fat substitute provides the organoleptic properties of fat, wherein said fat substitute has been heated with aqueous material to gel said fat substitute.

9. The method of claim 8, wherein the seeds are oats.

10. The method of claim 8, wherein the seeds are barley.

11. The method of claim 8, wherein said food has both aqueous and non-aqueous ingredients, and said fat substitute is gelled by heating it with at least one said aqueous ingredient prior to combining it with said non-aqueous ingredients of said food.

12. The method of claim 8, wherein said fat substitute has a particle size between about 0.5 and 20 μm prior to said gelling step.

13. The method of claim 8, wherein the ratio of starch to protein in said microparticles is between about 60:40 and about 95:5.

14. The method of claim 13, wherein said ratio is about 85:15.

15. The method of claim 8, wherein said food composition is a dairy product or dairy product substitute.

16. The method of claim 8, wherein the method further comprises the step of adding gelatin in an amount effective to control a temperature at which the gel will melt.

* * * * *